Oct. 31, 1967  V. F. CARTWRIGHT  3,350,711
PULSED RANGE AND ANGLE MEASURING SYSTEM
Filed May 2, 1966  3 Sheets-Sheet 3
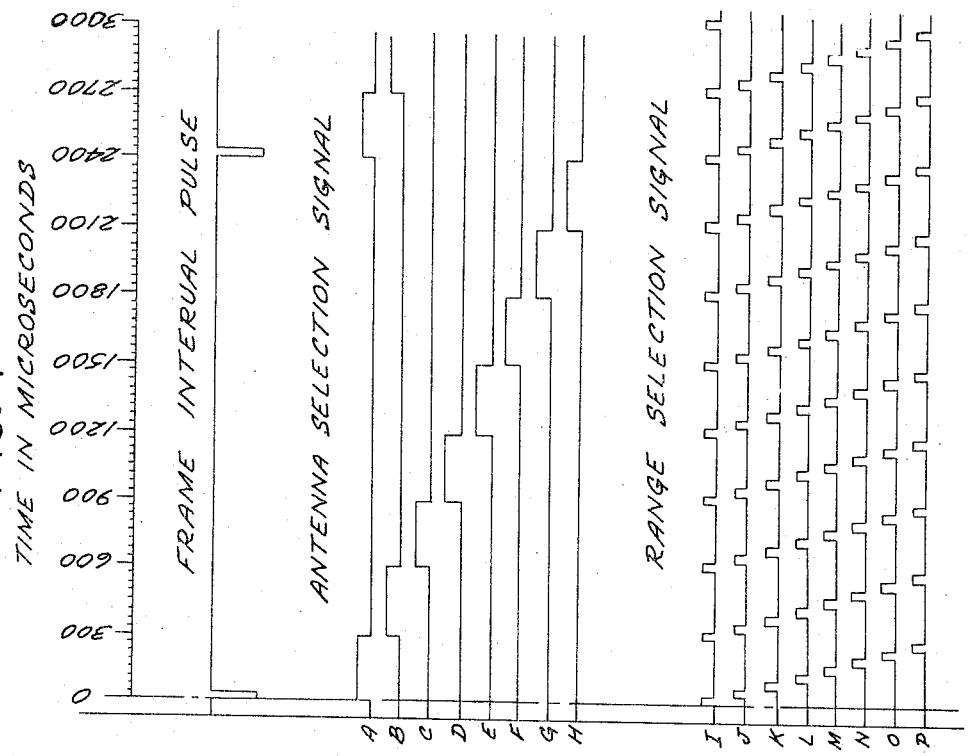
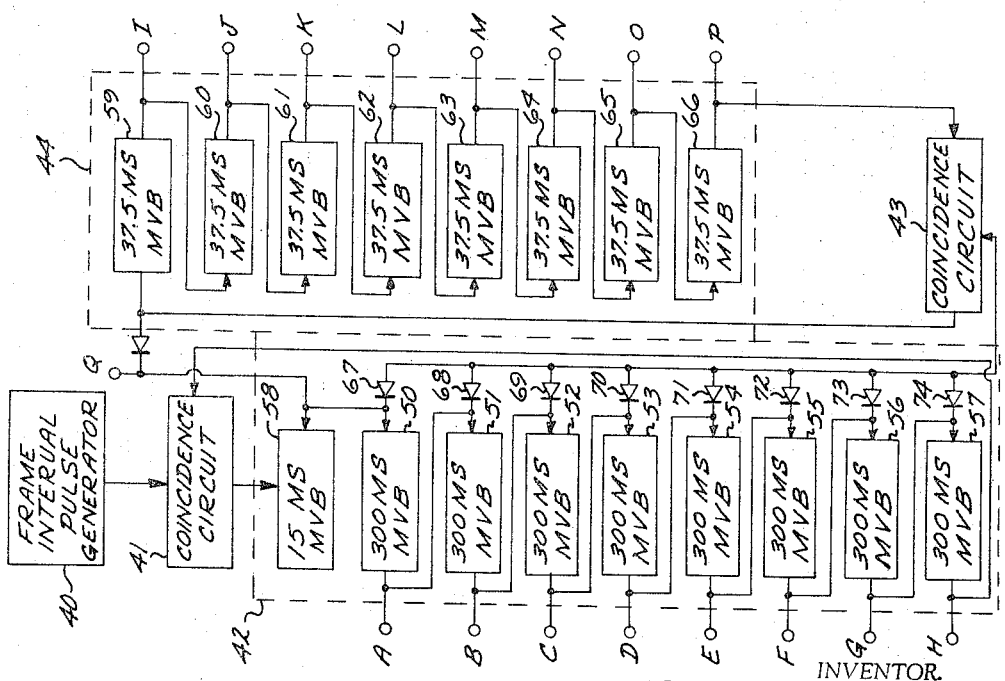
INVENTOR.
VICTOR F. CARTWRIGHT
BY
*Harvey C. Liervos.*
ATTORNEY

United States Patent Office 3,350,711
Patented Oct. 31, 1967

3,350,711
PULSED RANGE AND ANGLE MEASURING SYSTEM
Victor F. Cartwright, Fullerton, Calif., assignor to Babcock Electronics Corporation, Costa Mesa, Calif., a corporation of California
Filed May 2, 1966, Ser. No. 546,752
9 Claims. (Cl. 343—11)

ABSTRACT OF THE DISCLOSURE

The specification describes a pulsed range and angle measuring system which includes a radio transmitter for transmitting pulses in the direction of an object whose distance and direction are to be measured. In addition it includes a receiver capable of receiving one signal directly from the transmitter and another signal from the transmitter after reflection from the object. Those two signals, or signals derived from them, are applied to a mixer. One of them is applied only after a time delay and after being phase modulated. The mixer comprises a plurality of mixers and the delayed signal is delayed for a different period with respect to each of them whereby the output of each mixer is indicative of the receipt of a reflected signal of different range. The system includes a plurality of receiving antennas which are switched sequentially to the input of the receiver. The system includes an indicating arrangement which indicates separately the range of any echo signals received by each antenna. To this end the system provides for sequential switching of the antennas and of the indicators and it also includes, for each antenna an antenna indicator, sequential sampling of the output of the several mixers.

---

This invention relates to improvements in range and angle measuring systems and in particular to a system which transmits pulses of radio frequency energy and receives back reflections of that energy. Such systems are employed, for example, in measuring the range and angle at which bullets pass an airborne target.

An object is to provide a system having improved range resolution power. In a system which is used for scoring effectiveness of small arms fire against a moving target such as a drone target aircraft, the relative velocity of the drone and projectile will vary from 500 to 4,000 feet per second, the drone may have altitude from 50 to 5,000 feet, and the projectile may be small—perhaps 40 millimeters and less in diameter and 100 millimeters and less in length. Such a system will be required to measure range distances from drone to projectile down to five feet or zero feet with accuracy better than five feet. The invention, while not limited to that application, is capable of providing superior systems of that kind and will be described in relation to that application.

In the invention so applied, a transmitter and receiver combination are arranged so that pulses of radio frequency energy are generated in the transmitter and emitted by an antenna. Some of that energy after being reflected or echoed by a target (here a missile) is received by a receiving antenna system and applied to a receiver. The receiver is of the superheterodyne type in that it employs a mixer having two inputs and an output from whence is derived signals having a frequency which is the difference between the frequencies of the signals applied to the mixer inputs. The echo signal is applied to one input of the mixer and a signal derived directly from the transmitter is applied to the other input of the mixer.

The transmitter generates and transmits pulses or bursts of radio frequency energy. Some time elapses during which the energy travels outwardly to a target and is reflected to the receiving antenna and applied to a first mixer input. If the signal to the second mixer input is applied directly from the transmitter when the pulse is generated, then the pulse at the second input may have ended before the echoed signal is applied to the first input. In that case there would be no mixer output. In the invention means are provided for delaying application of the transmitter pulse to the second mixer input for a selected time. Suppose, for example, that the transmitting and receiving antennas are next to one another so that the distance from the transmitting antenna to a target is the same as the distance from the target to the receiving antenna. Suppose also that application of energy from the transmitter directly to the second mixer input was delayed for a time equal to the time required for radio frequency energy to traverse a distance of forty feet. Now, if an input signal arrives at the first mixer input simultaneously with the input signal to the second mixer, then the first mixer input signal must also have travelled forty feet so it can be concluded that the range of the target was twenty feet. It can be arranged to determine if there are other reflective targets at other distances by changing the delay period to correspond to the transit times for energy to be echoed to the receiver from such other distances.

In the system thus far described the signals to the two mixer inputs have the same frequency in which case no output would be had from the mixer even if the arrival times of the input signals did coincide. In practice the echo signal may include a doppler component because of relative movement between the missile and the system antennas but this component, which may be difficult to distinguish from noise, is not employed in the invention. The frequency of the signal derived from the transmitter generator and the echo signal are considered to have the same frequency. Instead, means are provided in the invention for modulating one of the signal inputs to the mixer so that a signal of the modulation frequency will appear at the mixer output if the echo signal transit time is the same as the second input delay time. Phase modulation is preferred now but other types may be employed.

Thus far described the system is capable of determining whether there is a target at one distance or, more accurately, within a range centered about a selected distance because the resolution of the range measurement is a function of the duration of the transmitter pulses. In a preferred form of this application of the invention, means are provided for determining whether there are targets at other distances. Advantageously this means comprises a plurality of mixers to which the echo signal is applied in parallel. The transmitter pulse signal is applied to the second input of each mixer after a time delay which is different in the case of each mixer. Thus the time delay to one mixer may correspond to a forty foot range transit time. The delay to a second mixer may correspond to a thirty-five foot range transit time, and so on. Means are also provided for examining the output of each mixer in turn to determine whether it has an output signal indicating presence of a target at the range corresponding to each mixer. In a preferred form this means comprises means to filter and amplify mixer output and to trigger generation of a range pulse having longer duration than the mixer output signal. It further comprises a means, as for example, a gate and pulse function generator combination, for examining in turn the several range pulse generators to determine whether they have been triggered.

The pulse function generator is also employed, in the application of the invention selected for illustration and description, to switch a number of receiving antennas. A number of directional antennas, oriented so that together they are capable of receiving echos from a number of directions or all directions in one or more planes, are switched to the receiver in a predetermined sequence at a predetermined rate. Advantageously the pulse function generator comprises means for connecting such antennas to the receiver one at a time for a given interval. During each interval the function generator opens in sequence the gate associated with each mixer of the receiver. The gates open to a common output circuit which is connected to one input of a pulse mixer. The other pulse mixer input is connected to receive the output of a frame generator which initiates and controls recycling of the pulse function generator. The pulse mixer output modulates a telemetry transmitter whose transmissions are received by a telemetry receiver whose output actuates a visual range and angle display mechansim.

The transmitting and receiving antennas, the antenna switch, the pulse function generator, the range pulse generator, the pulse mixer, the telemetry receiver and transmitter, and the display mechanism advantageously have the same form as that disclosed in my copending application Serial Number 545,930, filed April 28, 1966 and entitled Range and Angle Measuring System.

The echo signal and the transmitter signal may be applied to the receiver mixers at the frequency at which they are generated in the transmitter. Advantageously, however, one or both signals are converted to a lower frequency to simplify manufacture and adjustment and to reduce component cost.

The invention is well suited to this application because it permits signal handling in a way that minimizes the effect of radio frequency noise that is prevalent in the drone aircraft that are often employed to carry range and angle measuring systems for scoring effectiveness of small arms fire. It permits low altitude operation and multiple range measurement as well as angle measurement. A very narrow pulse may be employed so that high resolution and accuracy can be achieved while minimizing equipment microphonics. Such a system requires a wide receiver band width which reduces sensitivity. However, effective sensitivity is regained in the mixing and filtering scheme employed in which mixer output is subjected to a narrow band width filter.

The accompanying drawings show this embodiment of the invention. However, various modifications of this embodiment and other embodiments of the invention are possible without departing from the spirit and scope of the appended claims.

Figure 1:
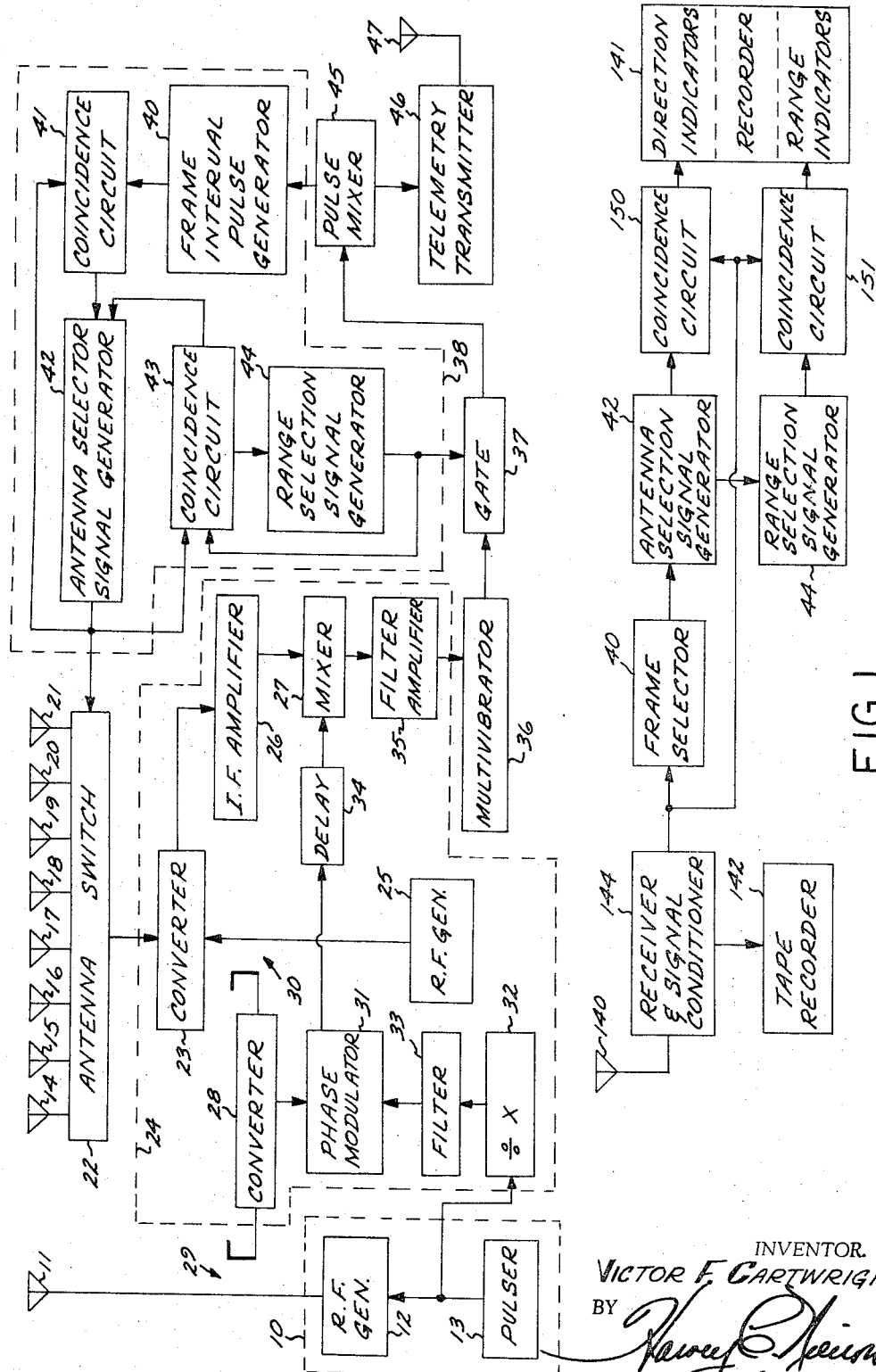
FIGURE 1 is a block diagram of a system embodying the invention.

FIGURE 3 is a diagram of portions of the system shown in FIGURE 1, including the frame interval pulse generator and the pulse function generator comprising the antenna selection signal generator, the range selection signal generator and their associated coincidence circuits; and FIGURE 4 is a diagram of the wave forms in time sequence generated by the pulse function generator and the frame interval pulse generator.

Like reference characters indicate corresponding parts throughout the several views of the drawings.

The system selected for description and which embodies the invention is shown in FIGURE 1. It comprises a means for generating and transmitting pulses of radio frequency energy which in this embodiment comprises a transmitter 10 and a transmitting antenna 11. The transmitter includes a radio frequency generator 12 and a pulser 13. Energy radiated from antenna 11 might be reflected or echoed back to means for receiving such signals here shown as eight directional receiving antennas designated by numerals 14, 15, 16, 17, 18, 19, 20 and 21, respectively. An antenna switch 22 connects each of the antennas in sequence to one input of a converter 23 of a receiver 24. A local RF generator 25 supplies a signal to the other input of converter 23. Converter output is amplified in an intermediate amplifier 26 and then is applied to one input of a mixer 27. Another converter 28 has one input coupled as at 29 to the pulsed output of radio frequency generator 12. Its other input is coupled as at 30 to the output of the radio frequency generator 25.

The output of converter 28 is phase modulated (advantageously plus and minus ninety degrees) in phase modulator 31 at a frequency which is some submultiple X (ten in the embodiment shown) of a signal derived from pulser 13 divided by ten in divider 32, and applied to modulator 31 through a filter 33. The output of the phase modulator 31 is applied to the other input of mixer 27 through a delay element 34.

Mixer output is filtered and amplified in a filter-amplifier 35 and is made to trigger a monostable multivibrator 36. Multivibrator output is applied to a gate 37 which may be an AND gate as shown. Gate opening is accomplished by a pulse from a pulse function generator 38.

Means are provided in the invention for actuating the antenna switch 22 and for opening the gate 37, or a number of such gates in sequence if a number are employed. In this embodiment pulse function generator 38 is that means. It includes a frame interval pulse generator 40 which generates a pulse that initiates action of the function generator, neglecting temporarily the coincidence circuit 41, the frame generator output is applied to antenna selection generator 42 which switches to one antenna and sends a signal via coincidence circuit 43 to the range selection signal generator 44. The latter opens the gate or gates 37 in sequence and when the last has been opened, the coincidence circuit 43 sends a signal to reinitiate the range selection signal action. At the same time it sends a signal to the antenna selector generator 42 to switch to the next receiving antenna. When the last of the antennas has been switched, the antenna selector generator applies a signal to coincidence circuit 41 which permits the frame interval pulse generator 40 to apply to the antenna selector 42 the pulse that initiates the next frame.

The gate 37 opens to an output circuit which in this embodiment comprises a pulse mixer 45 and a telemetry transmitter 46 and an antenna 47. Gate output and the frame pulse from frame interval pulse generator are combined in the pulse mixer 45. The output, if echo signals are intercepted by the receiving antennas, is a number of pulses which by their spacing from the beginning of the frame, identify the range of the target and the directional antenna by which the echo was received.

The pulse function generator is shown in greater detail in FIGURE 3. The antenna function generator or antenna selector signal generator 42 includes eight monostable multivibrators connected in series and designated by numerals 50, 51, 52, 53, 54, 55, 56 and 57, respectively. In the absence of output from multivibrator 57, the output of which is connected to coincidence circuit 41, the frame interval pulse generator 40 supplies an initiating signal to the 15 microsecond monostable multivibrator 58 which, in turn, triggers multivibrator 50. The latter turns on in the embodiment shown for 300 microseconds and then turns off. During its "ON" period, multivibrator 50 supplies an output signal to line A. The turning off of the multivibrator initiates turn-on of multivibrator 51. The latter stays on for 300 microseconds during which time it supplies a signal to line B. At the end of this time the turning off of multivibrator 51 signals turn-on of multivibrator 52 and so on. This process continues as shown by the graphs of FIGURE 4 and lines A through H are supplied with signals in turn.

Finally multivibrator 57 turns off permitting the frame interval generator to initiate a new frame.

The range function generator or range selection signal generator 44 comprises eight monostable multivibrators numbered 59, 60, 61, 62, 63, 64, 65 and 66. They are connected in series. Each furnishes a pulse, which in this embodiment has a 37.5 microsecond duration, to its respectively associated output line I through P. Each turns on when the preceding multivibrator turns off. The initial turn-on signal is provided by coincidence circuit 43 when the last in line, multivibrator 66, is turned off and when any one of the antenna selection multivibrators 50 through 57 is turned on. The latter condition is sensed through diodes 67, 68, 69, 70, 71, 72, 73 and 74 which have a common connection to coincide circuit 43 on one side and are connected to the inputs of multivibrators 50 through 57, respectively, on the other side.

Figure 2:
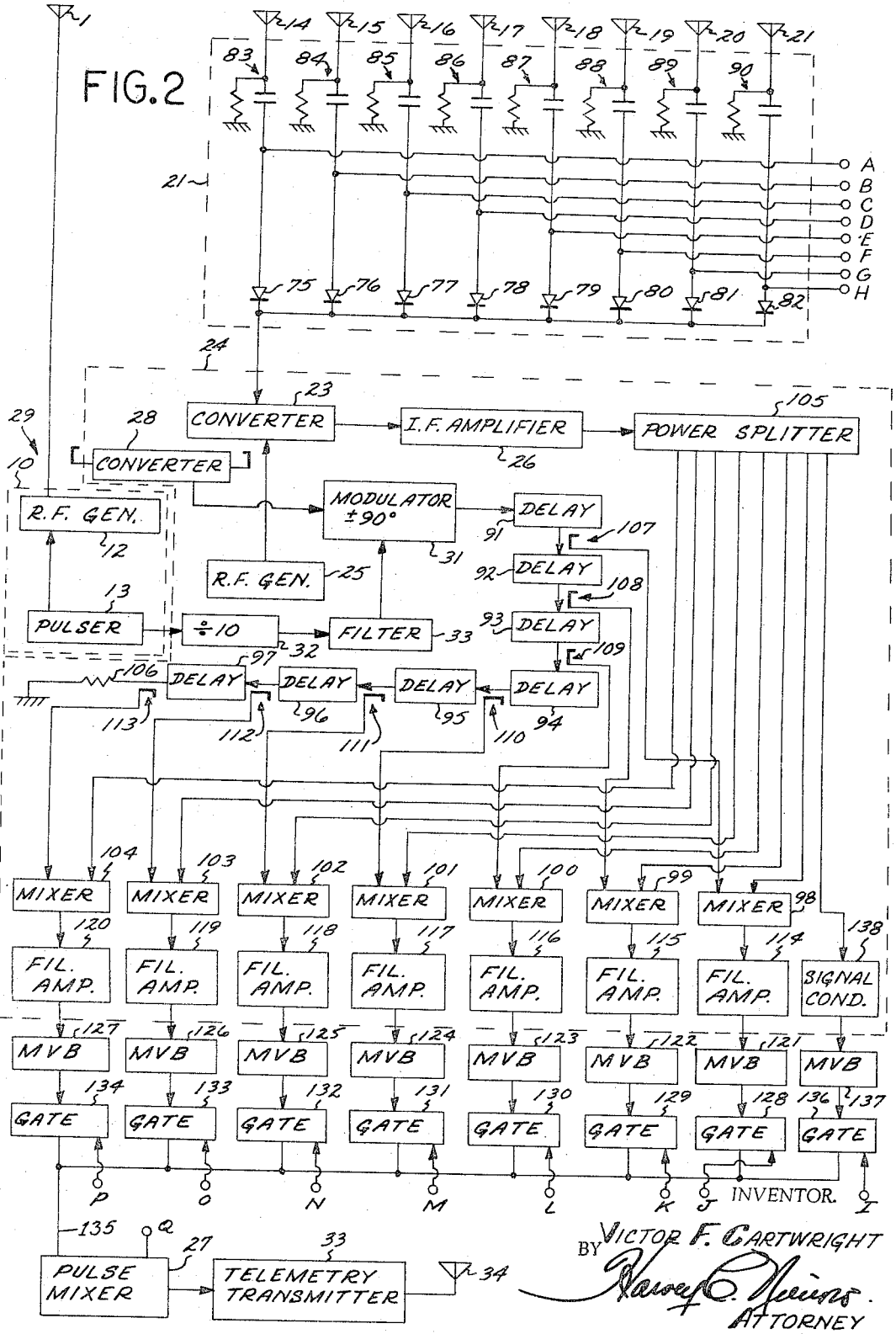
FIGURE 2 is a diagram of portions of the system shown in FIGURE 1 including the pulse transmitter, transmitting and receiving antennas, antenna switch, the receiver and components associated with it, the pulse mixer, and the telemetry transmitter.

Lines A through P of FIGURE 3 are connected to lines A through P of FIGURE 2, respectively. Pulses appearing on lines A through H render conductive the normally nonconducting diodes 75, 76, 77, 78, 79, 80, 81 and 82, respectively, whereby antennas 14, 15, 16, 17, 18, 19, 20 and 21 are connected to receiver 24. Tuning circuits 83, 84, 85, 86, 87, 88, 89 and 90 tune the antenna circuits. Each includes a resistor connected from the antenna transmission line to ground and a coupling capacitor in the line.

The delay apparatus 34 of FIGURE 1 is shown in FIGURE 2 to comprise a series of delay elements 91, 92, 93, 94, 95, 96 and 97. The mixer means 27 of FIGURE 1 is shown in the embodiment depicted in FIGURE 2 to comprises even individual mixers 98, 99, 100, 101, 102, 103 and 104 each having two inputs. Echo signals converted in converter 23 and amplified in I.F. amplifier 26, are applied by a power splitter 105 to one input of each of the mixers 98 through 104 in parallel. The other input of each mixer is coupled to the delay line which begins at the output of the phase modulator 31 and terminates at a load resistor 106 which connects to ground. The other input of mixer 98 is coupled, as at 107, to the delay line following delay element 91. The corresponding input of mixer 99 is coupled to the delay line, as at 108, following delay element 92. Similarly the corresponding inputs of mixers 100, 101, 102, 103 and 104 are coupled as at 109, 110, 111, 112 and 113 to the delay line following delay elements 93, 94, 95, 96 and 97, respectively. The outputs of the seven mixers 98 through 104 are connected to filter-amplifiers 114, 115, 116, 117, 118, 119 and 120, respectively. The output circuits of the seven filter-amplifiers are connected to the inputs of seven monostable multivibrators. Thus filter-amplifiers 114 through 120 are connected to multivibrators 121, 122, 123, 124, 125, 126 and 127, respectively. These multivibrators 121 through 127 have their outputs connected to one input of seven AND gates 128, 129, 130, 131, 132, 133 and 134, respectively. The other input of these seven gates 128 through 134 is connected to line J, K, L, M, N, O and P, respectively, of the pulse function generator 38. The output of all of gates 128 through 134 is connected to a common output circuit comprising line 135, pulse mixer 27, telemetry transmitter 33 and antenna 34. Line I of the pulse function generator is connected to the short range gate 136. This is an AND gate and like the others its output is connected to common output line 135 and its other input is connected to the output of a monostable multivibrator. The multivibrator 137 derives its turn-on signal from a signal conditioner 138. One eighth of the power output into the power splitter 105 is supplied to the signal conditioner 138 where it is filtered and clipped.

In the embodiment of the invention selected for description the transmitter 10 comprises a cavity oscillator, grid pulsed with an avalanche driven blocking oscillator. Carrier frequency is 4700 megacycles per seconds and the pulse repetition rate is 330 kilocycles per second whereby the pulse interval is 3.3 microseconds. The rise and decay times of the pulse are less than 0.01 microsecond with little or no dwell time. Thus pulsed, transmitter peak output powers of 100 watts are readily attained and are largely contained in a band width of 200 megacycles per second. In general, where direct measurement of range is to be made the accuracy of measurement is limited to approximately twice the reciprocal of the band width employed. This means that for a band width of 200 megacycles the system accuracy can be plus or minus 2.5 feet.

The local radio frequency generator 25 advantageously has an output frequency of 4100 megacycles per second whereby the output of both converters 23 and 28 is 600 megacycles. The I.F. amplifier 26 is centered on this frequency and has a band width of 200 megacycles. The divider 32 advantageously divides by ten so that the phase modulation frequency is 33 kilocycles per second. Modulating at an exact submultiple of the pulse frequency assures that no phase jumps will occur in the mixer.

The delay line may be any type such for example as a coaxial line or a reflection type. In the embodiment shown the delay introduced at each delay element other than the first corresponds to ten feet of radio frequency wave travel or five feet of range. The delay introduced by the first delay element 91 corresponds to a range of ten feet. Since the delay elements 91, 92, 93, 94, 95, 96 and 97 are in series, the delay in the signal input to mixers 98, 99, 100, 101, 102, 103 and 104 corresponds to 10, 15, 20, 25, 30, 35 and 40 feet respectively. There is no delay in application of echo signal to the mixers or to signal conditioner 138.

If the echo signal is returned from a target at a range, for example, of fifteen feet it will be applied to all the mixers and signal conditioner simultaneously. The amount of energy reflected from that range will be too small to permit turn-on of multivibrator 137 by signal conditioner 138 which passes only very strong signals. At mixer 98 the modulator output, having been delayed for a time corresponding to ten feet will have ended prior to arrival of the fifteen foot range echo so there will be no output from mixer 98. At mixers 100, 101, 102, 103 and 104 the echo signal will be ended before the modulated signal derived directly from the transmitter 10 will have arrived. Thus, no signal will issue from them. At mixer 99, however, the modulated signal, having been delayed for a time corresponding to fifteen feet of range, arrives at the mixer simultaneously with the echo signal. There will be a 33 kilocycle output to filter-amplifier 115.

The band width of this filter, like the others, is six kilocycles in this embodiment which is considered generally to be a minimum band width to pass a burst of energy 300 microseconds long. The pulse function generator switches antennas every 300 microseconds so that input from a directive antenna receiving an echo is 300 microseconds or less long. The band width of the amplifier section of the filter-amplifier is greater than six kilocycles and gain is sufficient to provide a turn-on signal to the multivibrators. The multivibrators are calibrated to operate for an interval of about 37 microseconds if initiated by a signal from their respectively associated filters. This is the same interval that the function generator "searches" for multivibrator signals by applying operating pulses to the gates. Three hundred milliseconds is required to search at all the gates but the multivibrator signal to the gate need only last as long as the function generator signal. Because of the delay line, a signal will not appear at a mixer and its filter-amplifier and multivibrator until a time which is the same time that the pulse function generator searches for a signal from that mixer.

When a gate is opened to permit passage of multivibrator output to the output circuit or line 135 it is applied to one input of the pulse mixer 27. The frame pulse is applied to the other input Q which is connected to line Q of FIGURE 3. The mixer output is applied to telemetry transmitter 33 and radiated by antenna 34 to receiving antenna 140 shown in FIGURE 1. The antenna is connected to a receiver and signal conditioner 144 whose output may, as shown, be supplied to a tape recorder 142 and as shown, to a pulse function generator. Like the pulse function generator 38, it consists of a frame interval pulse generator or frame selector 40, an antenna selection signal generator or antenna function generator 42, and a range selection signal or range function generator 44. A coincidence circuit 150 and a coincidence circuit 151 permit passage of antenna and range signals from receiver 144 to recorder 141 when the antenna and range function generators provide coinciding signals. Recorder 141 and the telemetry receiver itself are described in greater detail in the aforementioned copending application.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. In a range measuring system wherein pulses of radio frequency energy emanating from a transmitter are intercepted by a superheterodyne receiver after reflection from a target; means for introducing two signals of like frequency to the two inputs of the mixer of said receiver such that one signal is introduced when a reflected signal is intercepted and such that the other signal is introduced following emanation of said pulse after a delay, said delay corresponding to the time required for energy from the transmitter to reach the receiver after reflection from a target at a selected range; means for phase modulating one of said signals at a phase modulation frequency and means for detecting signals having said phase modulation frequency at the output of said mixer.

2. A pulse transmitter and receiver combination for measuring range to a point from which energy emitted by the transmitter is echoed to the receiver comprising a transmitter of pulses of radio frequency energy, a receiver comprising a plurality of mixers; means responsive to receipt at said receiver of said echoed energy for applying a first signal of one frequency to one input of each of said mixers; means responsive to transmission of a pulse by said transmitter for applying a second signal of said one frequency to the other input of each receiver after a delay to each mixer which corresponds to the time required for energy from said transmitter to reach said receiver after being echoed from a point at a selected distance which distance is different for each mixer; means for phase modulating one of said first and second signals at a modulation frequency; and means for detecting signals of said modulation frequency at the outputs of said mixers.

3. A pulse transmitter and receiver combination for measuring range to a point from which energy emitted by the transmitter is echoed to the receiver comprising a transmitter of pulses of radio frequency energy, a receiver comprising a plurality of mixers; means responsive to receipt at said receiver of such echoed energy for applying a first signal of one frequency to one input of each of said mixers; means responsive to transmission of a pulse by said transmitter for applying a second signal of said one frequency to the other input of each receiver after a delay to each mixer which corresponds to the time required for energy from said transmitter to reach said receiver after being echoed from a point to a selected distance which distance is different for each mixer; means for phase modulating one of said first and second signals at a modulation frequency; and means for detecting signals of said modulation frequency at the outputs of said mixers including means for sampling the output of said mixers in sequence.

4. A pulse transmitter and receiver combination for measuring range to a point from which energy emitted by the transmitter is echoed to the receiver comprising a transmitter of pulses of radio frequency energy, a receiver comprising a plurality of mixers; means responsive to receipt at said receiver of such echoed energy for applying a first signal of one frequency to one input of each of said mixers; means responsive to transmission of a pulse by said transmitter for applying a second signal of said one frequency to the other input of each receiver after a delay to each mixer which corresponds to the time required for energy from said transmitter to reach said receiver after being echoed from a point at a selected distance which is different for each mixer; means for phase modulating one of said first and second signals at a modulation frequency; and means for detecting signals of said modulation frequency at the outputs of said mixers including a plurality of filters each having its input connected to the output of a corresponding one of said mixers, a plurality of multivibrators each connected to the output of a corresponding one of said filters and responsive to signals applied through said filters to generate a pulse at its output, a plurality of gates each connected to the output of an associated multivibrator, and means comprising a pulse generator for opening said gates sequentially.

5. A pulse transmitter and receiver combination for measuring range to a point from which energy emitted by the transmitter is echoed to said receiver comprising: a transmitter of pulses of radio frequency energy; a receiver having an internal radio frequency energy generator, first and second converters, means for introducing to the inputs of said first converter radio frequency energy from said transmitter and from said internal generator to produce at its output during a transmitter pulse a signal having the frequency of the difference in the frequencies of said energies, means for introducing to the inputs of said second converter radio frequency energy from said internal generator to produce at its output at the time of arrival at said receiver of an echoed pulse a signal having said frequency of the difference in the frequencies of said energies, mixing means for receiving the outputs of said converters and providing an output corresponding to the difference in the frequencies of the signals received by said mixing means, modulating means for phase modulating the output of one converter before application to said mixing means, and delay means for delaying receipt by said mixing means of the output of said first converter for a time corresponding to the time required for a pulse of said radio frequency energy to travel from said transmitter to said receiver after being echoed from a point at a selected distance from each of them; and indicating means responsive to output signals from said mixing means.

6. The invention defined in claim 5 in which said mixing means comprises a plurality of mixers to which the output of said second converter is applied in parallel and in which said delay means comprises means for introducing a different delay in the application of the output of said first mixer to each of said mixers.

7. The invention defined in claim 5 in which said modulating means phase modulates converter output at a submultiple of the frequency of the transmitter output.

8. In a system for measuring range and angle from a target of a moving missile: transmitter means for transmitting pulses of radio frequency energy to a missile; receiving antenna means comprising a plurality of antennas each sensitive to a relatively different direction for intercepting said radio frequency after reflection from a missile; receiver means for providing output signals indicative of the range at which energy intercepted by said antenna means were reflected comprising a plurality of mixers, means responsive to interception of such energy for introducing to one input of each of said mixers in parallel signals to one frequency, means responsive to generation of pulses of energy by said transmitter for applying to the other input of each of said mixers signals of said one frequency after a delay whose duration differs in the case of each mixer, and means for phase modulating the signal applied to one of said inputs of said mixer; switching means for switching said plurality of antennas to said receiver means sequentially; and indicating means for indicating the range and direction of missiles reflecting radio signals from said transmitter means to said receiving antenna means including means responsive to said output signals for indicating range, and further including means for indicating which antenna was connected to said radio receiver means when said reflected signal was received.

9. In combination: a function generator including means for generating a first succession of pulses and means responsive to initiation of each pulse in said first succession to initiate a second succession of pulses; an output circuit; a plurality of means for intercepting input signals of radio frequency energy; a transmitter of radio frequency energy; a receiver comprising a plurality of means for providing range signals respectively indicative of different time intervals between transmission of radio frequency energy by said transmitter and receipt of said energy by said means for intercepting input signals; means responsive to said first succession of pulses for connecting said plurality of means for intercepting input signals one at a time in succession to said receiver; and means responsive to said second succession of pulses for connecting said means for providing range signals one at a time in succession to said output circuit including a mixer, first means responsive to generation of radio frequency energy by said transmitter and second means responsive to interception of said energy by said means for intercepting radio frequency energy, for applying signals of like frequency to the inputs of said mixer, means for delaying application of the signal from said first means to said mixer for a predetermined time, and means for phase modulating the signal applied to one input of said mixer.

References Cited

UNITED STATES PATENTS

| | | | |
|---|---|---|---|
| 2,866,967 | 12/1958 | Bernbaum | 343—11 |
| 2,991,467 | 7/1961 | Clarke | 343—13 |
| 3,087,151 | 4/1963 | Vantine | 343—13 X |
| 3,099,833 | 7/1963 | Tucker et al. | 343—11 X |

RODNEY D. BENNETT, *Primary Examiner.*

C. L. WHITHAM, *Assistant Examiner.*